(12) United States Patent
Chou et al.

(10) Patent No.: US 11,314,111 B2
(45) Date of Patent: Apr. 26, 2022

(54) DISPLAY PANEL

(71) Applicant: AU Optronics (Kunshan) Co., Ltd., Kunshan (CN)

(72) Inventors: Wen-Chieh Chou, Kunshan (CN); Hsing-Hao Tseng, Kunshan (CN); Kai-Yu Chung, Kunshan (CN); Kai-Teng Chiang, Kunshan (CN)

(73) Assignee: AU OPTRONICS (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 16/982,231

(22) PCT Filed: Apr. 8, 2019

(86) PCT No.: PCT/CN2019/081721
§ 371 (c)(1),
(2) Date: Sep. 18, 2020

(87) PCT Pub. No.: WO2020/199230
PCT Pub. Date: Oct. 8, 2020

(65) Prior Publication Data
US 2021/0157195 A1    May 27, 2021

(30) Foreign Application Priority Data
Apr. 3, 2019 (CN) .......................... 201910267405.4

(51) Int. Cl.
*G02F 1/1333* (2006.01)
*G02F 1/1339* (2006.01)
*G02F 1/1345* (2006.01)

(52) U.S. Cl.
CPC ...... *G02F 1/133302* (2021.01); *G02F 1/1339* (2013.01); *G02F 1/1345* (2013.01)

(58) Field of Classification Search
CPC . G02F 1/133302; G02F 1/1339; G02F 1/1345
See application file for complete search history.

(56) References Cited

U.S. PATENT DOCUMENTS 5,851,411 A * 12/1998 An .................... G02F 1/133512
216/23
7,167,227 B2 * 1/2007 Aruga ................. G02F 1/13452
349/152
(Continued)

FOREIGN PATENT DOCUMENTS

| CN | 101308292 A | 11/2008 |
|---|---|---|
| CN | 102289111 A | 12/2011 |

(Continued)

*Primary Examiner* — Hoan C Nguyen
(74) *Attorney, Agent, or Firm* — WPAT, PC

(57) ABSTRACT

The invention discloses a display panel having a display region and a wire out region on one side of the display region, comprising: a first substrate including a main body part and a glue blocking part connected to the main body part, a thickness of the main body part being different from a thickness of the glue blocking part; a second substrate opposite to the first substrate; and a sealant arranged between the first substrate and the second substrate, and located between the display region and the wire out region, wherein the glue blocking part is located on one side of the sealant close to the wire out region. The thickness of the main body part of the first substrate in the display panel of the invention is different from the thickness of the glue blocking part, and before curing, the sealant does not spill into the wire out region due to obstruction action of the glue blocking part, thereby not affecting a peeling process of the panel after cutting.

14 Claims, 4 Drawing Sheets

(56) References Cited

U.S. PATENT DOCUMENTS

| | | | | |
|---|---|---|---|---|
| 8,072,571 | B2* | 12/2011 | Kita | G02F 1/1341 |
| | | | | 349/153 |
| 2009/0237775 | A1* | 9/2009 | Ito | G02F 1/167 |
| | | | | 359/296 |
| 2011/0043734 | A1* | 2/2011 | Chang | G02F 1/1339 |
| | | | | 349/106 |
| 2015/0346556 | A1* | 12/2015 | Hirota | G02F 1/1339 |
| | | | | 349/43 |
| 2016/0011444 | A1* | 1/2016 | Xie | G02F 1/1339 |
| | | | | 349/153 |
| 2017/0017101 | A1* | 1/2017 | Morita | G02F 1/13394 |
| 2017/0047541 | A1 | 2/2017 | Ishii et al. | |
| 2018/0203318 | A1* | 7/2018 | Abe | G02F 1/136286 |
| 2019/0285926 | A1* | 9/2019 | Lai | G02F 1/1341 |

FOREIGN PATENT DOCUMENTS

| | | | | |
|---|---|---|---|---|
| CN | 102636915 | A | | 8/2012 |
| CN | 102707509 | A | | 10/2012 |
| CN | 103676337 | A | | 3/2014 |
| CN | 107819014 | A | | 3/2018 |
| CN | 109307957 | A | | 2/2019 |
| JP | 2007024923 | A | | 2/2007 |
| JP | 2008197672 | A | | 8/2008 |
| JP | 2010228998 | A | * | 10/2010 |
| JP | 2011029081 | A | * | 2/2011 |
| WO | WO-2016086538 | A1 | * | 6/2016 ............. H01L 51/56 |

* cited by examiner

DISPLAY PANEL

BACKGROUND OF THE INVENTION

1. Field of the Invention

The invention relates to the technical field of display devices, and specifically to a display panel.

2. Related Art

Currently, in the processes of manufacturing the display panel, after a sealant is coated onto one substrate, two substrates are often vacuum laminated, then the sealant is cured via a curing process such as ultraviolet and high temperature, and finally the substrate is cut. Structural design of a narrow bezel architecture causes that position of a cutting line and design space of the sealant are limited, so the uncured sealant easily flows to the cutting position, thereby affecting a cutting process of the panel, and residue of the sealant makes peeling of the panel impossible after cutting. If a large distance is reserved for an edge of the sealant and the cutting line, a ratio occupied by a display region of the display panel after cutting is limited, which does not facilitate production of light and thin liquid crystal panels, and also results in waste of the substrate.

SUMMARY OF THE INVENTION

An object of the invention is to provide a display panel for solving the problem of difficult peeling of the panel after cutting because the sealant of the current display panel spills into the wire out region.

To achieve the above object, the display panel of the invention has a display region and a wire out region on one side of the display region, and comprises: a first substrate including a main body part and a glue blocking part connected to the main body part, a thickness of the main body part being different from a thickness of the glue blocking part; a second substrate opposite to the first substrate; and a sealant arranged between the first substrate and the second substrate, and located between the display region and the wire out region, wherein the glue blocking part is located on one side of the sealant close to the wire out region.

In one embodiment of the display panel, the first substrate is made of glass.

In one embodiment of the display panel, the thickness of the main body part is greater than the thickness of the glue blocking part.

In one embodiment of the display panel, a width of the glue blocking part is from 50 μm to 150 μm.

In one embodiment of the display panel, the first substrate further comprises a peripheral part, the glue blocking part is connected to the main body part and the peripheral part, and a thickness of the peripheral part is greater than the thickness of the glue blocking part.

In one embodiment of the display panel, the thickness of the peripheral part is identical with the thickness of the main body part.

In one embodiment of the display panel, the thickness of the main body part is less than the thickness of the glue blocking part.

In one embodiment of the display panel, a width of the glue blocking part is from 50 μm to 200 μm.

In one embodiment of the display panel, the first substrate further comprises a peripheral part, the glue blocking part is connected to the main body part and the peripheral part, and the peripheral part protrudes from the second substrate in the wire out region.

In one embodiment of the display panel, the main body part has a main body inner surface facing the second substrate, and a main body side surface connected to the glue blocking part, wherein an angle between the main body inner surface and the main body side surface is greater than 90 degrees.

In one embodiment of the display panel, the peripheral part has a peripheral inner surface facing the second substrate, and a peripheral side surface connected to the glue blocking part, wherein an angle between the peripheral inner surface and the peripheral side surface is greater than 90 degrees.

In one embodiment of the display panel, the second substrate protrudes from the first substrate in the wire out region.

Advantageous effects of the invention lie in that the thickness of the main body part of the first substrate in the display panel of the invention is different from the thickness of the glue blocking part, and before curing, the sealant does not spill into the wire out region due to obstruction action of the glue blocking part, thereby not affecting a peeling process of the panel after cutting.

Hereinafter the invention is described in detail with reference to the accompanying drawings and the detailed embodiments, but the invention is not limited thereto.

PREFERABLE EMBODIMENTS OF THE INVENTION

Hereinafter the technical solution of the invention is described in detail with reference to the accompanying drawings and the detailed embodiments, so as to further understand the object, the solution and the effect of the invention, rather limiting the protection scope of the appended claims of the invention.

References such as "one embodiment", "another embodiment", "this embodiments" and the like in the specification refer to that the embodiment may comprise specific feature, structure or characteristic, but it is unnecessary for each embodiment to comprise such specific feature, structure or characteristic. Moreover, such expressions may not refer to the same embodiment. Further, when the specific feature, structure or characteristic is described with reference to one embodiment, regardless of clear description, it has shown that incorporating such specific feature, structure or characteristic into other embodiment is within the knowledge range of those skilled in the art.

Although specific terms are used in the specification and the subsequent claims to refer to specific components or parts, it shall be understood that the technician or manufacturer can give a different name or term to the same component or part. The specification and the subsequent claims distinguish components or parts from each other by different functions of the components or parts, instead of different names "Comprise" and "include" in the whole specification and the subsequent claims are open words and shall be explained as "include but is not limited to". In addition, "connection" herein includes any direct or indirect connection means.

It shall be noted that in the invention, orientation or positional relationship indicated by the terms "transverse", "longitudinal", "up", "down", "front", "back", "left", "right", "vertical", "horizontal", "top", "bottom", "in", "out", and the like is the orientation or positional relationship illustrated by the drawings, and is only for the purpose of describing the invention and simplifying the explanation, rather indicating or suggesting that the referred device or element must have specific orientation, and be constructed and operated in specific orientation, so it shall not be understood as limits to the invention. For clarity of explanation, phrases of order such as "first", "second", "third" and "fourth" mentioned here are to distinguish an element, region and part from another identical or similar element, region and part, instead of limiting the specific element, region and part.

Figure 1:
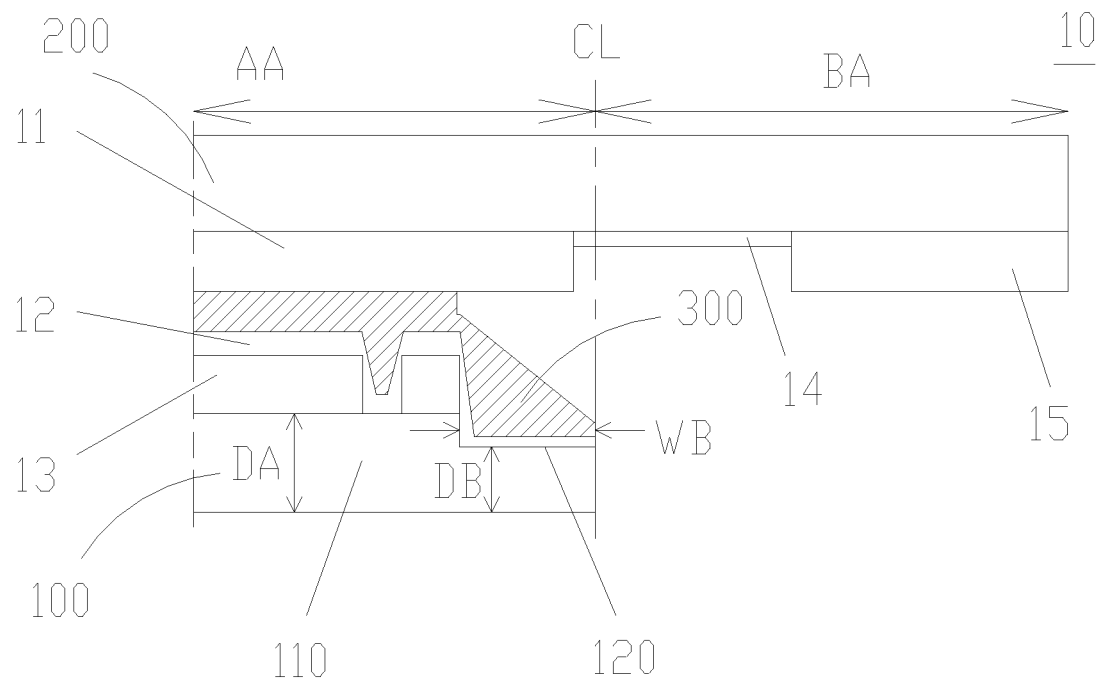
FIG. 1 is a schematic diagram of a cross-sectional structure of a display panel in one embodiment of the invention.

As shown in FIG. 1, FIG. 1 is a schematic diagram of a cross-sectional structure of a display panel in one embodiment of the invention. The display panel 10 has a display region AA and a wire out region BA on one side of the display region AA, wherein the wire out region BA is a non-display region for placing or connecting a driving circuit, a driving chip, and a flexible circuit board. In one embodiment of the invention, the display panel 10 comprises a first substrate 100, a second substrate 200 and a sealant 300. The second substrate 200 is opposite to the first substrate 100. The sealant 300 is arranged between the first substrate 100 and the second substrate 200, and located between the display region AA and the wire out region BA. In other words, one side of the sealant 300 close to the wire out region BA is located between the display region AA and the wire out region BA, and other sides are located outside of the display region AA. The sealant 300 functions to adhere and fix the first substrate 100 and the second substrate 200. The first substrate 100 includes a main body part 110 and a glue blocking part 120 connected to the main body part 110, a thickness of the main body part 110 being different from a thickness of the glue blocking part 120, and the glue blocking part 120 is located on one side of the sealant 300 close to the wire out region BA.

In one embodiment of the invention, the display panel further comprises a TFT component layer 11, an alignment layer 12, a light shielding layer 13, a wiring 14 and a driving chip 15, wherein the TFT component layer 11, the alignment layer 12 and the light shielding layer 13 are located in the display region AA, the driving chip 15 is located in the wire out region BA, and the wiring 14 is connected to the display region AA and the wire out region BA. As is seen from the cross-sectional structure of FIG. 1, the light shielding layer 13, the alignment layer 12, the sealant 300 and the TFT component layer 11 are sequentially sandwiched between the first substrate 100 and the second substrate 200, the wiring 14 and the driving chip 15 are located on the second substrate 200, and the driving chip 15 is connected to the TFT component layer 11 via the wiring 14. This is only one of common structures of the display panel in the art, and the invention is not limited thereto.

Figure 2:
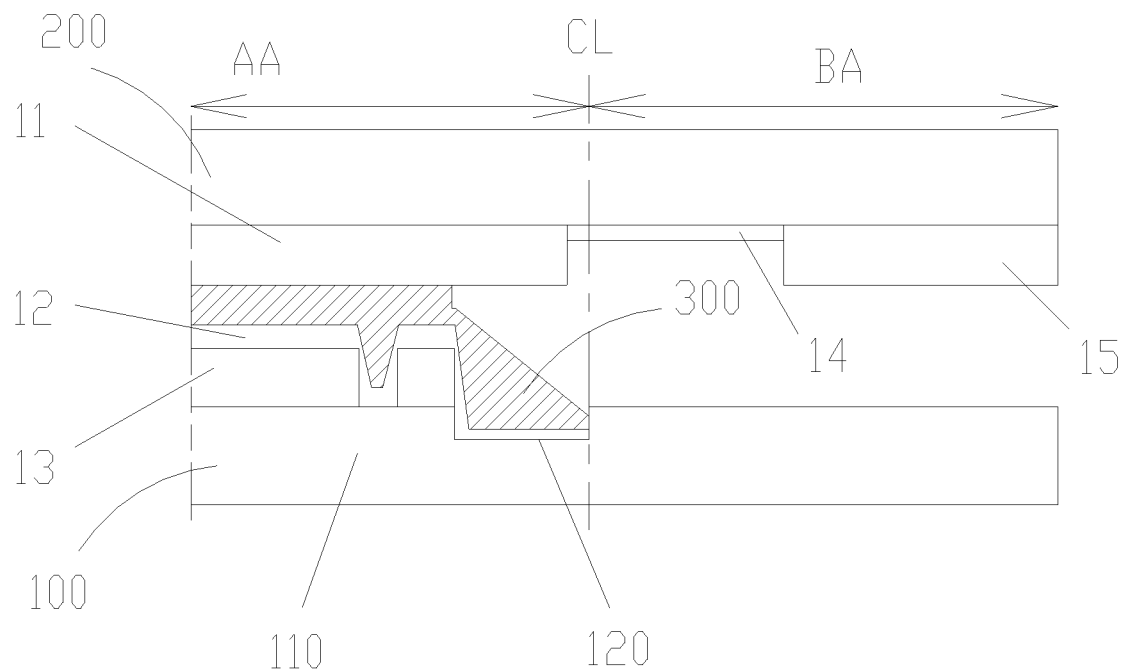
FIG. 2 is a schematic diagram of a cross-sectional structure of a display panel before a cutting process in one embodiment of the invention.

As shown in FIGS. 1 and 2, FIG. 2 is a schematic diagram of a cross-sectional structure of a display panel before a cutting process in one embodiment of the invention. That is, the display panel of FIG. 2 is the display panel shown in FIG. 1 formed after a cutting process at a cutting line CL on the first substrate. Before curing, the sealant 300 does not spill into the wire out region BA due to obstruction action of the glue blocking part 120, thereby not affecting a peeling process of the panel after cutting.

In this embodiment, the first substrate 100 is, for example, a color filter (CF) substrate, and the second substrate 200 is, for example, a thin film transistor (TFT) substrate, i.e., the glue blocking part 120 is formed on the CF substrate. Optical materials such as a polarized sheet can be adhered on upper and lower of the first substrate 100 and the second substrate 200, and a liquid crystal layer (not shown) and a pixel layer (not shown) can be provided between the first substrate 100 and the second substrate 200. The display panel of this embodiment also may be a touch display panel, and touch function may be integrated into a module consisting of the first substrate 100 and the second substrate 200. For example, the touch function is integrated between the liquid crystal layer and the second substrate 200. These are forms of common structures in the art, and the details are not described here. In other embodiments, the first substrate 100 can be a TFT substrate, and the second substrate 200 can be a CF substrate, i.e., the glue blocking part 120 is formed on the TFT substrate. Explanations are given in the following embodiment.

It shall be noted that the first substrate 100 is a base board, or a mother board. In one embodiment, the first substrate 100 is glass, and the thickness of the main body part 110 is different from the thickness of the glue blocking part 120 through laser, mechanical trenching, mold shaping or etching. The first substrate 100 is provided with desired film layers after the glue blocking part 120 is formed.

As shown in FIG. 1, in one embodiment, a thickness DA of the main body part 110 of the first substrate 100 is greater than a thickness DB of the glue blocking part 120. In other words, the glue blocking part 120 is in a groove shape. In actual implementation, the thickness DA of the main body part 110 of the first substrate 100 is, for example, a basic thickness of the glass base board, and the glue blocking part 120 with smaller thickness DB is formed by an etching process. The uncured glue flows into the groove formed by the glue blocking part 120, so as to avoid the glue from spilling into a region of the first substrate 100 in the wire out region BA. A width WB of the glue blocking part 120 may be from 50 μm to 150 μm.

Figure 3:
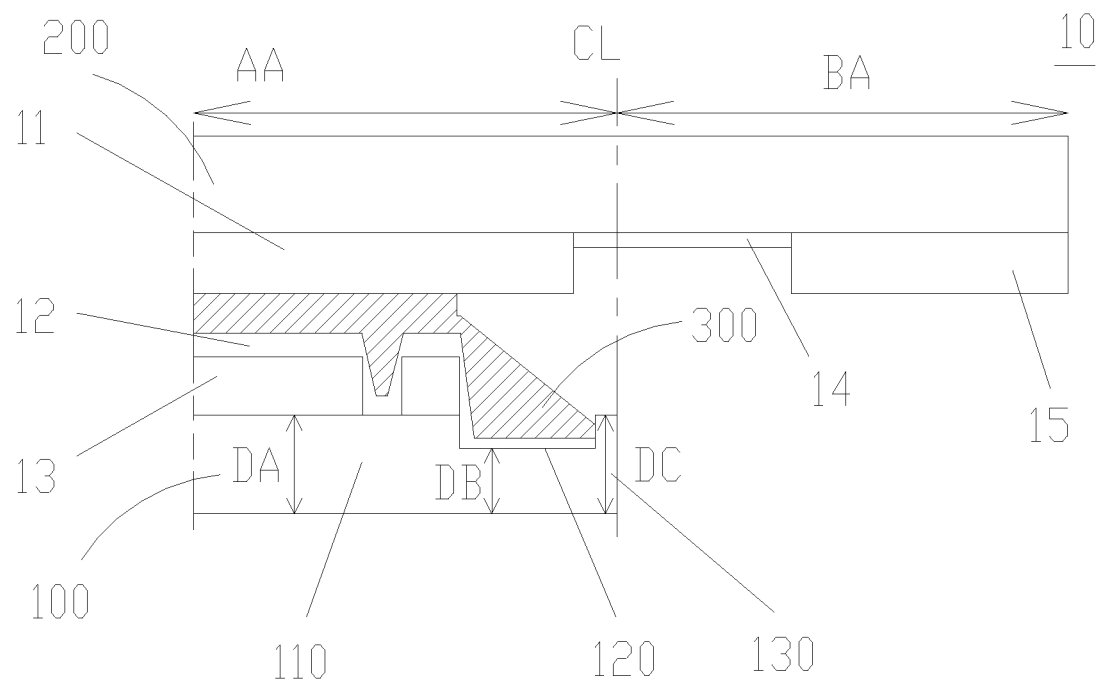
FIG. 3 is a schematic diagram of a cross-sectional structure of a display panel in one embodiment of the invention.

As shown in FIG. 3, in another embodiment of the invention, the first substrate 100 further comprises a peripheral part 130, the glue blocking part 120 is connected to the main body part 110 and the peripheral part 130, and a thickness DC of the peripheral part 130 is greater than the thickness DB of the glue blocking part 120. In other words, the thickness of the glue blocking part 120 is less than the thickness of the main body part 110 and the peripheral part 130 on both sides.

The thickness DC of the peripheral part 130 is, for example, identical with the thickness DA of the main body part 110. Actual production processes may be forming a groove type glue blocking part 120 on the glass substrate through process such as laser, mechanical trenching, mold shaping or etching before the film layers of the first substrate 100 are formed as a CF substrate, and leaving the whole groove type glue blocking part 120 on the first substrate 100 after cutting since the cutting line CL is on the peripheral part 130.

Figure 4:
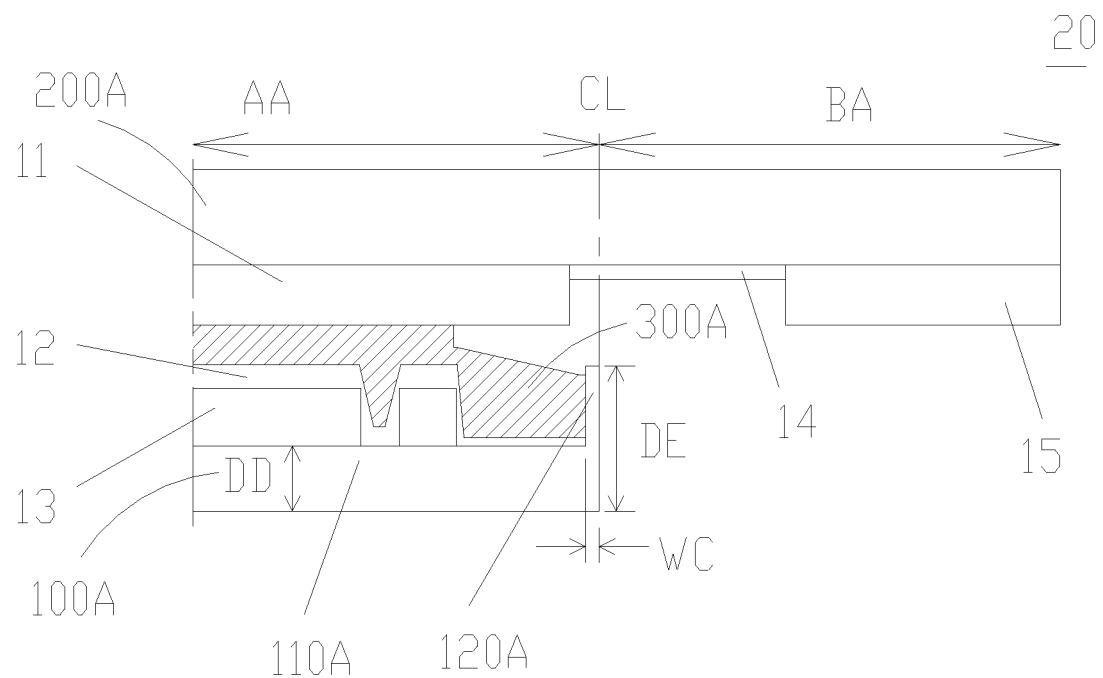
FIG. 4 is a schematic diagram of a cross-sectional structure of a display panel in one embodiment of the invention.
Figure 5:
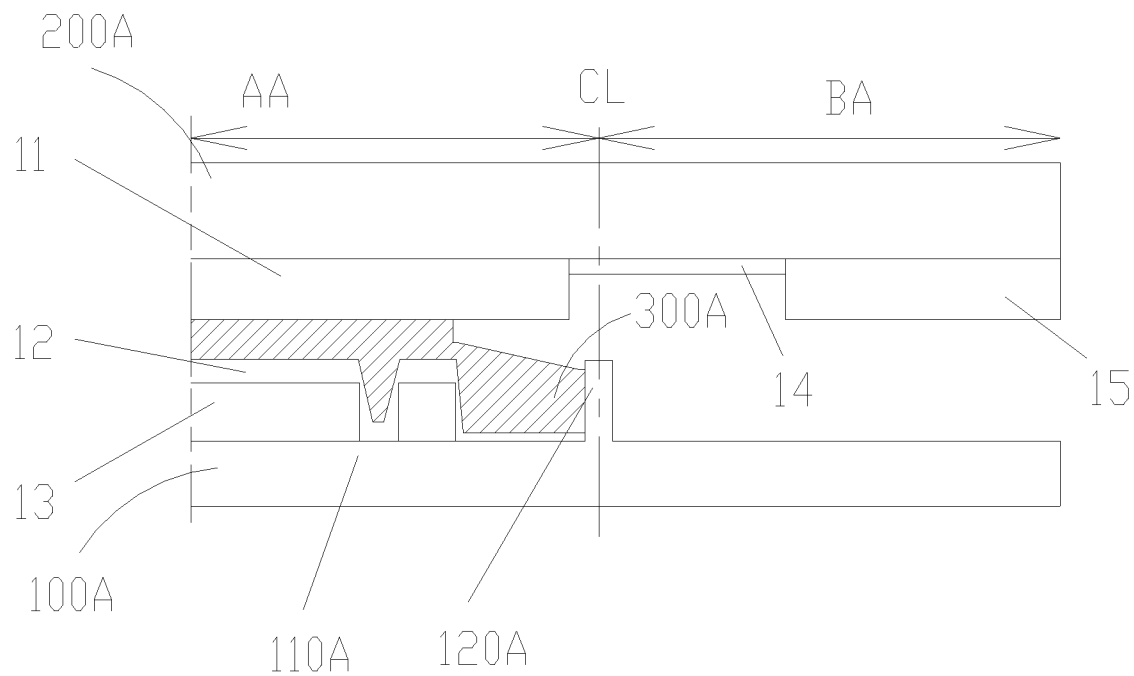
FIG. 5 is a schematic diagram of a cross-sectional structure of a display panel before a cutting process in one embodiment of the invention.

As shown in FIGS. 4 and 5, FIG. 5 is a schematic diagram of a cross-sectional structure of a display panel before a cutting process in one embodiment of the invention. That is, the display panel of FIG. 5 is the display panel shown in FIG. 4 formed after a cutting process at a cutting line CL on the first substrate. In this embodiment, the display panel 20 comprises a first substrate 100A, a second substrate 200A and a sealant 300A, and the first substrate 100A includes a main body part 110A and a glue blocking layer 120A.

This embodiment differs from the previous embodiment in that the first substrate 100A allows a thickness of the main body part 110A to be less than a thickness of the glue blocking layer 120A through laser, mechanical trenching, mold shaping or etching, for example. After the glue blocking part 120A is formed, desired film layers are further provided. Specifically, a thickness DD of the main body part 110A of the first substrate 100A is less than a thickness DE of the glue blocking layer 120A. In other words, the glue blocking layer 120A is in a high wall shape. In actual implementation, the thickness DE of the glue blocking layer 120A of the first substrate 100A is, for example, a basic thickness of the glass base board, and the main body part 110A with smaller thickness is formed by an etching process. The uncured glue is blocked by the high wall type glue blocking layer 120A, so as to avoid the glue from spilling into a region of the first substrate 100A in the wire out region BA. Preferably, a width WC of the glue blocking part 120A may be from 50 μm to 200 μm.

Figure 6:
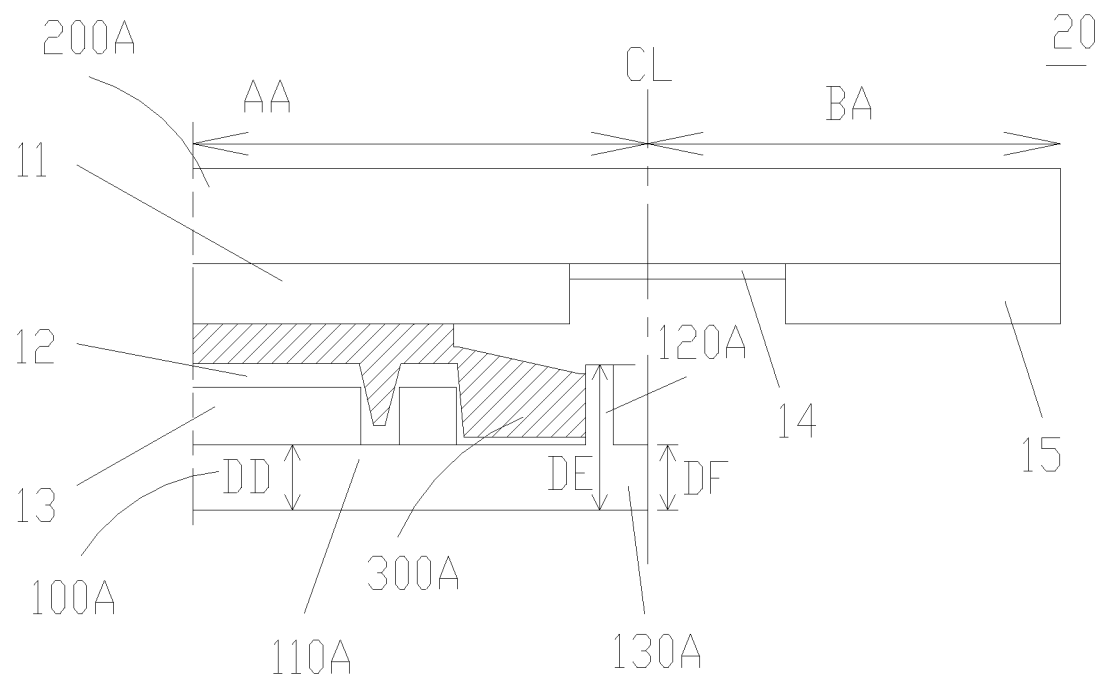
FIG. 6 is a schematic diagram of a cross-sectional structure of a display panel in one embodiment of the invention.

As shown in FIG. 6, in another embodiment of the invention, the first substrate 100A further comprises a peripheral part 130A, the glue blocking part 120A is connected to the main body part 110A and the peripheral part 130A, and a thickness DF of the peripheral part 130A is greater than the thickness DE of the glue blocking part 120A.

The thickness DF of the peripheral part 130A is, for example, identical with the thickness DD of the main body part 110A. Actual production processes may be forming a high wall type glue blocking part 120A on the glass substrate through process such as laser, mechanical trenching, mold shaping or etching before the film layers of the first substrate 100A are formed as a CF substrate, and leaving the high wall type glue blocking part 120A on the first substrate 100A after cutting since the cutting line CL is on the peripheral part 130A.

Figure 7:
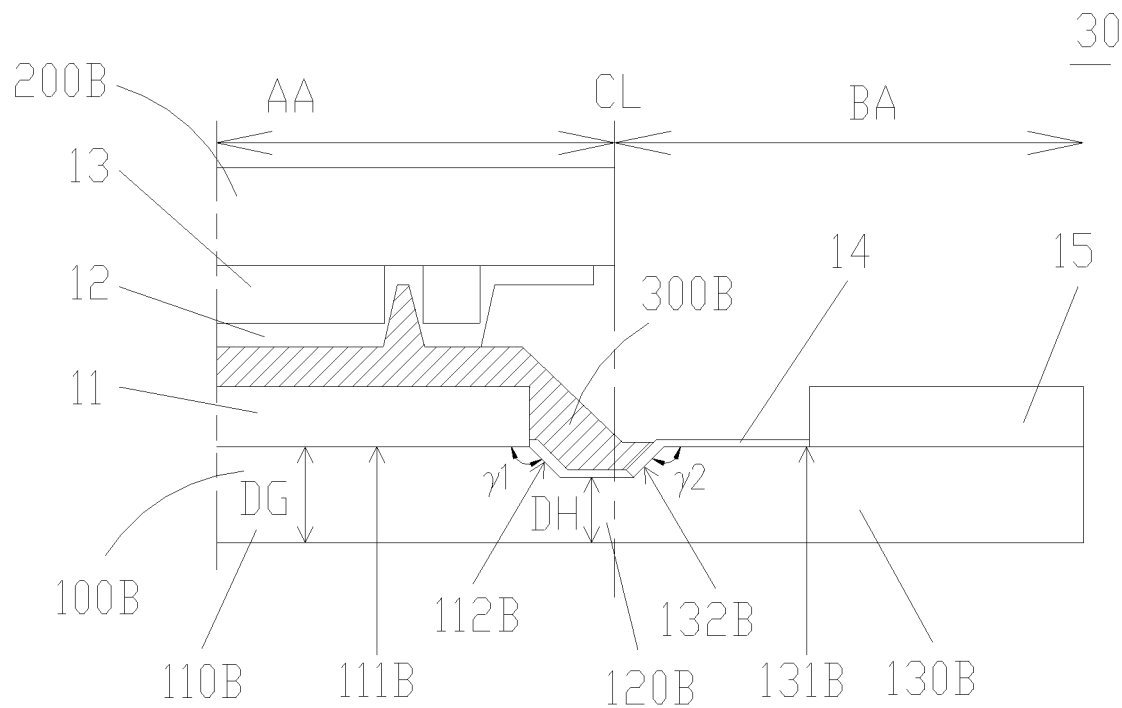
FIG. 7 is a schematic diagram of a cross-sectional structure of a display panel in one embodiment of the invention.

As shown in FIG. 7, in another embodiment of the invention, a display panel 30 comprises a first substrate 100B, a second substrate 200B and a sealant 300B, and the first substrate 100B includes a main body part 110B and a glue blocking layer 120B.

This embodiment differs from the previous embodiment in that the first substrate 100B of the display panel 30 is, for example, a TFT substrate, the first substrate 100B further comprises a peripheral part 130B, the glue blocking layer 120B is connected to the main body part 110B and the peripheral part 130B, and the peripheral part 130B protrudes from the second substrate 200B in the wire out region BA.

In this embodiment, a thickness DG of the main body part 110B is greater than a thickness DH of the glue blocking layer 120B, and a groove shape is formed at the glue blocking layer 120B. The main body part 110B has a main body inner surface 111B facing the second substrate 200B, and a main body side surface 112B connected to the glue blocking layer 120B, and an angle γ1 between the main body inner surface 111B and the main body side surface 112B is greater than 90 degrees.

The peripheral part 130B has a peripheral inner surface 131B facing the second substrate 200B, and a peripheral side surface 132B connected to the glue blocking layer 120B, and an angle γ2 between the peripheral inner surface 131B and the peripheral side surface 132B is greater than 90 degrees.

It shall be noted that the angle is a smaller angle between the main body inner surface 111B and the main body side surface 112B. In other words, the angle γ1 and the angle γ2 are both less than 180 degrees.

This embodiment allows a circuit line (such as, a connection line 14) on the peripheral part 130B to be gently connected from the wire out region BA to the display region AA through the angles greater than 90 degrees between the main body inner surface 111B and the main body side surface 112B of the main body part 110B, and between the peripheral inner surface 131B and the peripheral side surface 132B of the peripheral part 130B, and ensures reliability of line connection on the premise of ensuring the glue blocking layer 120B to have glue blocking function.

Figure 8:
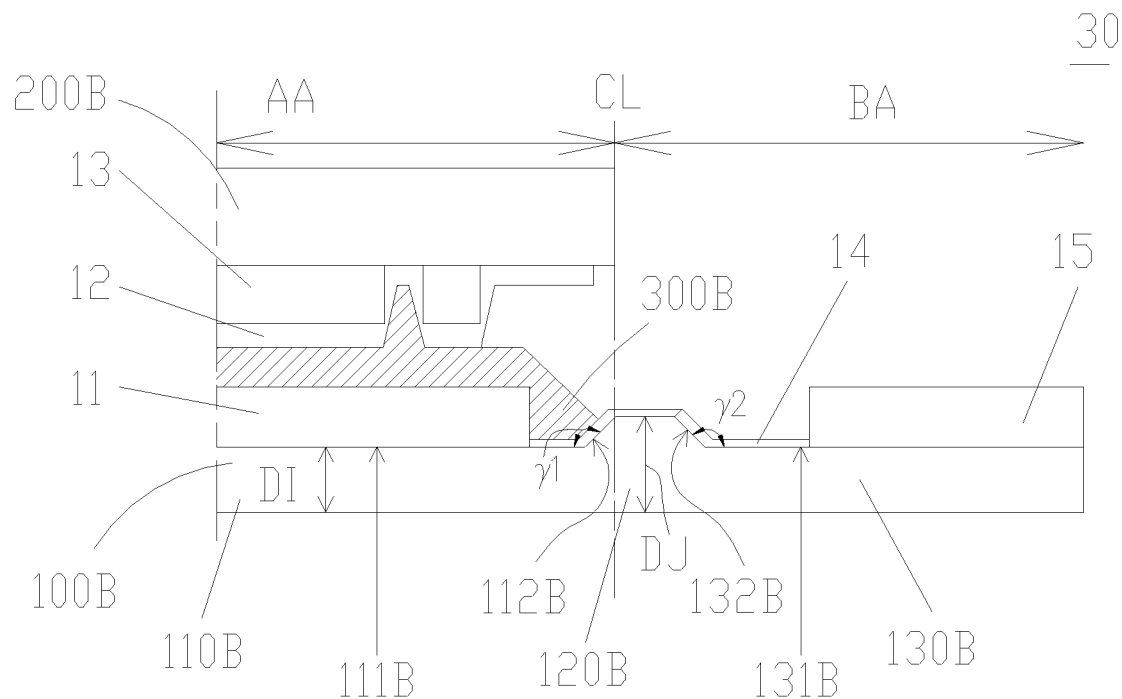
FIG. 8 is a schematic diagram of a cross-sectional structure of a display panel in one embodiment of the invention.

As shown in FIG. 8, this embodiment differs from the previous embodiment in that a thickness DI of the main body part 110B is less than a thickness DJ of the glue blocking layer 120B, and a high wall shape is formed at the glue blocking layer 120B. The main body part 110B has a main body inner surface 111B facing the second substrate 200B, and a main body side surface 112B connected to the glue blocking layer 120B, and an angle γ1 between the main body inner surface 111B and the main body side surface 112B is greater than 90 degrees.

The peripheral part 130B has a peripheral inner surface 131B facing the second substrate 200B, and a peripheral side surface 132B connected to the glue blocking layer 120B, and an angle γ2 between the peripheral inner surface 131B and the peripheral side surface 132B is greater than 90 degrees.

It shall be noted that the angle is a smaller angle between the main body inner surface 111B and the main body side surface 112B. In other words, the angle γ1 and the angle γ2 are both less than 180 degrees.

This embodiment allows a circuit line (such as, a connection line 14) on the peripheral part 130B to be gently connected from the wire out region BA to the display region AA through the angles greater than 90 degrees between the main body inner surface 111B and the main body side surface 112B of the main body part 110B, and between the peripheral inner surface 131B and the peripheral side surface 132B of the peripheral part 130B, and ensures reliability of line connection on the premise of ensuring the glue blocking layer 120B to have glue blocking function.

Of course, the invention also may have various other embodiments, and those skilled in the art shall make various corresponding changes and variations without departing from spirit and essence of the invention, but these corresponding changes and variations shall belong to the scope protected by the appended claims of the invention.

INDUSTRIAL PRACTICABILITY

The display panel of the invention is provided with a glue blocking part on one side of the sealant close to the wire out region, and before curing, the sealant does not spill into the wire out region due to obstruction action of the glue blocking part, thereby not affecting a peeling process of the panel after cutting, which solves the problem of difficult peeling of the panel after cutting because the sealant of the current display panel spills into the wire out region.

What is claimed is:

1. A display panel having a display region and a wire out region, comprising:
    a first substrate including a main body part and a glue blocking part adjacent to the main body part, wherein the main body part and the glue blocking part are integrally formed from the same material, a thickness of anywhere of the main body part being different from a thickness of the glue blocking part, and the glue blocking part is closer to the wire out region than the main body part is;
    a second substrate opposite the first substrate; and
    a sealant arranged between the first substrate and the second substrate;
    wherein the glue blocking part is partly positioned in the display region proximal to the wire out region, and the sealant is partly positioned in the display region proximal to the wire out region, between the glue blocking part and the second substrate.

2. The display panel according to claim 1, wherein the first substrate is made of glass.

3. The display panel according to claim 1, wherein the thickness of the main body part is greater than the thickness of the glue blocking part.

4. The display panel according to claim 3, wherein a width of the glue blocking part is from 50 μm to 150 μm.

5. The display panel according to claim 3, wherein the first substrate further comprises a peripheral part, the glue blocking part is connected to the main body part and the peripheral part, and a thickness of the peripheral part is greater than the thickness of the glue blocking part.

6. The display panel according to claim 5, wherein the thickness of the peripheral part is identical with the thickness of the main body part.

7. The display panel according to claim 1, wherein the thickness of the main body part is less than the thickness of the glue blocking part.

8. The display panel according to claim 7, wherein a width of the glue blocking part is from 50 μm to 200 μm.

9. The display panel according to claim 7, wherein the first substrate further comprises a peripheral part, the glue blocking part is connected to the main body part and the peripheral part, and a thickness of the peripheral part is greater than the thickness of the glue blocking part.

10. The display panel according to claim 9, wherein the thickness of the peripheral part is identical with the thickness of the main body part.

11. The display panel according to claim 1, wherein the first substrate further comprises a peripheral part, the glue blocking part is connected to the main body part and the peripheral part, and the peripheral part protrudes from the second substrate in the wire out region.

12. The display panel according to claim 1, wherein the main body part has a main body inner surface facing the second substrate, and a main body side surface connected to the glue blocking part, wherein an angle between the main body inner surface and the main body side surface is greater than 90 degrees.

13. The display panel according to claim 11, wherein the peripheral part has a peripheral inner surface facing the second substrate, and a peripheral side surface connected to the glue blocking part, wherein an angle between the peripheral inner surface and the peripheral side surface is greater than 90 degrees.

14. The display panel according to claim 1, wherein the second substrate protrudes from the first substrate in the wire out region.

* * * * *